United States Patent
Yokogi et al.

(10) Patent No.: US 10,131,761 B2
(45) Date of Patent: Nov. 20, 2018

(54) GLITTERING RESIN COMPOSITION AND DECORATED SHEET

(71) Applicant: MITSUBISHI CHEMICAL CORPORATION, Chiyoda-ku (JP)

(72) Inventors: Masashi Yokogi, Kitakyushu (JP); Taku Kitade, Nagahama (JP); Toshiaki Ebitani, Nagahama (JP)

(73) Assignee: MITSUBISHI CHEMICAL CORPORATION, Chiyoda-ku (JP)

( * ) Notice: Subject to any disclaimer, the term of this patent is extended or adjusted under 35 U.S.C. 154(b) by 0 days.

(21) Appl. No.: 13/832,315

(22) Filed: Mar. 15, 2013

(65) Prior Publication Data

US 2013/0202827 A1    Aug. 8, 2013

Related U.S. Application Data

(63) Continuation of application No. PCT/JP2011/074039, filed on Oct. 19, 2011.

(30) Foreign Application Priority Data

Oct. 20, 2010    (JP) ................................. 2010-235940

(51) Int. Cl.

| | |
|---|---|
| C08K 3/08 | (2006.01) |
| C08K 3/22 | (2006.01) |
| C08K 3/34 | (2006.01) |
| C08K 3/40 | (2006.01) |
| B32B 7/00 | (2006.01) |
| B32B 15/08 | (2006.01) |
| B32B 27/28 | (2006.01) |
| C08K 9/02 | (2006.01) |
| B32B 1/02 | (2006.01) |
| B32B 7/02 | (2006.01) |
| B32B 15/09 | (2006.01) |
| B32B 27/08 | (2006.01) |
| C08K 3/06 | (2006.01) |

(52) U.S. Cl.
CPC .................. *C08K 3/08* (2013.01); *B32B 1/02* (2013.01); *B32B 7/02* (2013.01); *B32B 15/08* (2013.01); *B32B 15/09* (2013.01); *B32B 27/08* (2013.01); *C08K 3/06* (2013.01); *C08K 3/22* (2013.01); *C08K 3/34* (2013.01); *C08K 3/40* (2013.01); *C08K 9/02* (2013.01); *Y10T 428/1359* (2015.01); *Y10T 428/24975* (2015.01); *Y10T 428/31507* (2015.04)

(58) Field of Classification Search
CPC .. C08K 9/02; C08K 3/08; C08L 69/00; B32B 15/08; B32B 27/365
USPC ......... 524/440, 441; 528/196; 428/35.9, 363
See application file for complete search history.

(56) References Cited

U.S. PATENT DOCUMENTS

| | | | |
|---|---|---|---|
| 6,486,251 B1* | 11/2002 | Patel .............................. 524/439 |
| 6,777,085 B1* | 8/2004 | Argoitia ................. C09C 1/0015 |
| | | | 428/328 |
| 7,666,972 B2* | 2/2010 | Jansen et al. .................. 528/196 |
| 7,718,755 B2* | 5/2010 | Chatterjee et al. ............ 528/196 |
| 8,039,183 B2* | 10/2011 | Veregin .............. G03G 9/08755 |
| | | | 430/108.1 |
| 8,088,212 B2* | 1/2012 | Bagala, Sr. .................... 106/415 |
| 2009/0075100 A1* | 3/2009 | Kitamura ............... B05D 5/068 |
| | | | 428/457 |
| 2009/0105393 A1 | 4/2009 | Jansen et al. |
| 2009/0105444 A1 | 4/2009 | Chatterjee et al. |
| 2012/0164444 A1* | 6/2012 | Kinoshita ......... B29C 45/14811 |
| | | | 428/337 |

FOREIGN PATENT DOCUMENTS

| | | |
|---|---|---|
| JP | 2005-231257 | 9/2005 |
| JP | 2007-001022 | 1/2007 |
| JP | 2007-326314 | 12/2007 |
| JP | 2008-56844 * | 3/2008 |
| JP | 2008-188970 | 8/2008 |
| JP | 2008-285518 | 11/2008 |
| JP | 2009-61762 A | 3/2009 |
| JP | 2009-074029 | 4/2009 |
| JP | 2009-120791 A | 6/2009 |
| JP | 2009-191227 | 8/2009 |

(Continued)

OTHER PUBLICATIONS

Machine translated JP 2007-326314, Dec. 20, 2007, Japan.*
English Abstract of JP2008-56844, Mar. 13, 2008, 3 pages.*
International Search Report dated Dec. 27, 2011 in PCT/JP2011/074039 filed Oct. 19, 2011.
Combined Office Action and Search Report dated Feb. 24, 2014, in Chinese Patent Application No. 201180050139.1 with English translation.
Chinese Office Action dated Sep. 24, 2014, in China Patent Application No. 201180050139.1 (with English translation).

(Continued)

*Primary Examiner* — Tae H Yoon
(74) *Attorney, Agent, or Firm* — Oblon, McClelland, Maier & Neustadt, L.L.P.

(57) ABSTRACT

The invention provides a glittering resin composition which includes: a polycarbonate resin that contains structural units derived from a dihydroxy compound having the portion represented by the following general formula (1) as a part of the structure thereof; and glittering particles in an amount of 0.1 parts by weight or more and 10 parts by weight or less per 100 parts by weight of the polycarbonate resin, wherein the glittering particles are inorganic particles (excluding metal particles) coated with a metal or a metal oxide or are metal particles:

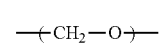

(1)

provided that a case where the portion represented by general formula (1) is a part of —CH$_2$—O—H is excluded.

20 Claims, No Drawings

(56) References Cited

FOREIGN PATENT DOCUMENTS

| JP | 2011-500925 A | | 1/2011 |
|---|---|---|---|
| WO | WO 2008/069725 A1 | * | 6/2008 |
| WO | 2009/052463 | | 4/2009 |
| WO | 2011/108593 | | 9/2011 |

OTHER PUBLICATIONS

Office Action dated Jul. 21, 2015 in Japanese Patent Application No. 2011-228936 (with English language translation).
Combined Taiwanese Office Action and Search Report dated Jul. 20, 2015 in Patent Application No. 100138039 (with English language translation).
Extended European Search Report dated Aug. 9, 2016, in European Patent Application No. 11834384.7.
Korean Office Action dated Aug. 18, 2017, in corresponding Korean Patent Application No. 10-2013-7009347 (w/English Translation).
Office Action dated Feb. 7, 2018 in European Patent Application No. 11 834 384.7.

* cited by examiner

GLITTERING RESIN COMPOSITION AND DECORATED SHEET

CROSS REFERENCE TO RELATED APPLICATION

This application is a continuation of PCT/JP2011/074039, filed on Oct. 19, 2011, and claims priority to Japanese Patent Application No. 2010-235940, filed on Oct. 20, 2010.

TECHNICAL FIELD

The present invention relates to a glittering resin composition which includes a polycarbonate resin and glittering particles, and relates to a decorated sheet which has a glittering resin layer using the composition.

BACKGROUND ART

Entrance doors and building materials for house walls around the entrance, external claddings of elevators, etc. are often covered with a decorated sheet in order to impart durability or design attractiveness thereto. Hitherto, materials obtained by covering a molded resin article, plywood, wooden board, metal plate or the like with a flexible vinyl chloride resin sheet (hereinafter referred to also as flexible PVC sheet) to which an embossed design has been imparted, or coated metal plates and the like have been used as building materials for use in such applications. Furthermore, as materials having a printed design, use has been made of materials having a configuration obtained by printing an acrylic sheet to which an ultraviolet absorber has been added and laminating a flexible PVC sheet to the acrylic sheet.

Flexible PVC sheets have various excellent features. In recent years, however, use of the vinyl chloride resins have come to be restricted because of the problem concerning heavy-metal compounds due to some of the stabilizers for the vinyl chloride resins, the problem concerning VOCs or endocrine disruption due to some of the plasticizers or stabilizers, the problem that the resins generate hydrogen chloride gas and other chlorine-containing gases during combustion, etc.

Under these circumstances, a resin sheet-covered metal plate having high surface hardness and produced using a polyester resin as a resin sheet substitute for the flexible PVC sheet, a resin sheet-covered metal plate which conforms to a plenty of color designs and is produced using a polyolefin resin, and the like have been proposed.

Furthermore, a resin sheet which includes an aromatic polycarbonate resin as a main component and which is excellent in terms of weatherability or embossability has been proposed.

The sheet described in patent document 1 has improved weatherability imparted thereto by incorporating a specific ultraviolet absorber into the aromatic polycarbonate resin.

The sheet described in patent document 2 includes a resin layer constituted of a transparent resin which contains specific glittering particles as an underlayer of a transparent aromatic polycarbonate resin layer. This sheet has been thereby made to have a glittering design.

The sheet described in patent document 3 has improved embossability imparted thereto by blending an aromatic polycarbonate resin with a polyester resin and thereby attaining an increase in tensile modulus.

BACKGROUND ART DOCUMENT

Patent Document

Patent Document 1: JP-A-2007-1022
Patent Document 2: JP-A-2007-326314
Patent Document 3: JP-A-2008-188970

SUMMARY OF INVENTION

Problem that Invention is to Solve

As disclosed in patent document 2, a resin sheet having a deep glittering design is obtained by disposing a glittering particles dispersed layer as an underlayer of a transparent surface layer. However, there have been cases where when glittering particles are mixed with an aromatic polycarbonate resin by melt kneading, this mixing arouses a trouble that the weight-average molecular weight of the resin decreases considerably and the resin sheet itself becomes brittle and apt to break. Consequently, it has been necessary that glittering particles which do not arouse the trouble concerning decrease in molecular weight should be especially selected and used, and there have been limitations on the degree of freedom of selecting means for imparting a glittering design and selecting the effects thereof.

Hitherto, the techniques described above have sufficed to meet requirements for specific applications. However, as a result of the increase in the range of applications and the advancement of requirements, such as an increase in design attractiveness and an increase in durability, the degree of freedom of selecting a wider variety of glittering designs than before has come to be required.

Accordingly, an object of the invention is to provide: a glittering resin composition which contains glittering particles and has undergone little decrease in weight-average molecular weight even when the glittering particles were incorporated through melt kneading, and with which a variety of glittering designs can hence be imparted; and a decorated sheet produced using the resin composition.

Means for Solving Problem

The present inventors diligently made investigations. As a result, the inventors have found that all the problems described above can be overcome with a glittering resin composition which includes a polycarbonate resin having a specific structure and specific glittering particles in specific amounts. The invention has been thus completed.

That is, the present invention is as follows.

1. A glittering resin composition, comprising:

a polycarbonate resin that contains structural units derived from a dihydroxy compound having a portion represented by the following general formula (1) as a part of a structure thereof; and glittering particles in an amount of 0.1 parts by weight or more and 10 parts by weight or less per 100 parts by weight of the polycarbonate resin, wherein the glittering particles are inorganic particles (excluding metal particles) coated with a metal or a metal oxide or are metal particles:

[Chem. 1]

(1)

[provided that a case where the portion represented by general formula (1) is a part of —CH$_2$—O—H is excluded.]

2. The glittering resin composition as described in item 1 above, wherein the dihydroxy compound is a dihydroxy compound represented by the following formula (2):

[Chem. 2]

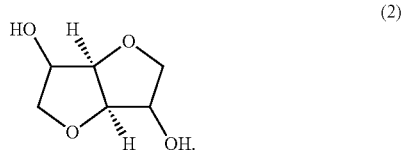

(2)

3. The glittering resin composition as described in item 1 or 2 above, wherein the inorganic particles (excluding metal particles) are at least one member selected from the group consisting of glass flakes, alumina flakes, silica flakes and mica flakes, and the metal particles are at least one member selected from the group consisting of silver flakes, nickel flakes, gold flakes, titanium flakes and aluminum flakes.

4. The glittering resin composition as described in any one of items 1 to 3 above, wherein a retention of a weight-average molecular weight of the glittering resin composition is 90% or more of a weight-average molecular weight of the polycarbonate resin.

5. The glittering resin composition as described in any one of items 1 to 4 above, wherein the polycarbonate resin has a glass transition temperature (Tg) of 80° C. or higher but lower than 145° C.

6. A molded object, which is obtained by injection-molding the glittering resin composition as described in any one of items 1 to 5 above.

7. A decorated sheet, comprising:

a layer that contains the glittering resin composition as described in any one of items 1 to 5 above.

8. The decorated sheet as described in item 7 above, comprising at least the following layer A and the following layer B:

Layer A: a resin layer that has visible-light transmission properties and has a thickness of 10 μm or larger;

Layer B: a resin layer that is constituted of the glittering resin composition according to any one of claims 1 to 5 and has a thickness of 30 μm or larger.

9. The decorated sheet as described in item 8 above, comprising at least three layers of the layer A, the layer B and the following layer C in this order and having a total thickness in a range of 75 μm or larger and 300 μm or less:

Layer C: a resin layer that is constituted of a resin composition containing a thermoplastic resin and a colorant and that has a thickness in a range of 45 μm or larger and 260 μm or less.

10. A resin sheet-covered metal laminate, which is obtained by laminating the decorated sheet as described in any one of items 7 to 9 above onto a metal plate.

11. An entrance door, comprising:
the resin sheet-covered metal laminate as described in item 10 above.

12. A building material, comprising:
the resin sheet-covered metal laminate as described in item 10 above.

13. A unit bath member, comprising:
the resin sheet-covered metal laminate as described in item 10 above.

14. A steel furniture member, comprising:
the resin sheet-covered metal laminate as described in item 10 above.

15. A housing for an electrical/electronic appliance, comprising:
the resin sheet-covered metal laminate as described in item 10 above.

16. An automotive interior material, comprising:
the resin sheet-covered metal laminate as described in item 10 above.

Effects of Invention

The polycarbonate resin to be used in the invention undergoes little decrease in weight-average molecular weight even when melt-mixed with glittering particles. As a result, it is possible to provide a glittering resin composition which includes the polycarbonate resin having a specific structure and glittering particles and with which a variety of glittering designs can be imparted.

Furthermore, the decorated sheet, which has a layer constituted of the glittering resin composition, can be made to have a wider variety of glittering designs than before. Consequently, resin sheet-covered metal laminates, for example, which employ the decorated sheet are suitable for use in various applications including entrance doors. The decorated sheet thus contributes to impartation of higher design attractiveness.

Mode For Carrying Out Invention

An explanation is given below on a glittering resin composition and a decorated sheet as one of the embodiments of the invention. However, the scope of the invention should not be construed as being limited to the embodiments explained below.

In the invention, the expression "contained as a main component" used for a component is a conception which means that the proportion of this component in the relevant portion is 50% by mass or higher, preferably 75% by mass or higher, especially preferably 90% by mass or higher, and may be 100% by mass.

The term "sheet" used in the invention includes both the range of thicknesses in which the materials are generally called "films" and the range of thicknesses in which the materials are generally called "sheets". For reasons of convenience, the two kinds of materials are inclusively called "sheets" in the invention. In the invention, "% by mass" has the same meaning as "% by weight".

Furthermore, the expression "having visible-light transmission properties" used for a layer in the invention means that another layer or metal plate which is located on the back side of the layer can be visually recognized through the layer. This layer has a total light transmittance, as measured in accordance with JIS K7105 (1981), of preferably 80% or higher, more preferably 84% or higher, especially preferably 88% or higher.

<Polycarbonate Resin>

The polycarbonate resin to be used in the invention is a polycarbonate resin which contains structural units derived from a dihydroxy compound having the portion represented by the following general formula (1) as part of the structure thereof, and this polycarbonate resin has visible-light transmission properties in typical embodiments.

[Chem. 3]

(1)

However, the case where the portion represented by general formula (1) is part of —CH$_2$—O—H is excluded.

Namely, the dihydroxy compound is a compound which at least contains two hydroxyl groups and further contains the portion of the general formula (1).

The main component of the dihydroxy compound having the portion represented by general formula (1) as part of the structure thereof is not particularly limited so long as the molecule thereof has the structure represented by general formula (1) therein. Specific examples thereof include compounds which have an aromatic group in a side chain and have, in the main chain, ether groups each bonded to an aromatic group, such as 9,9-bis(4-(2-hydroxyethoxy)phenyl)fluorene, 9,9-bis(4-(2-hydroxyethoxy)-3-methylphenyl) fluorene, 9,9-bis(4-(2-hydroxyethoxy)-3 sopropylphenyl) fluorene, 9,9-bis(4-(2-hydroxyethoxy)-3-isobutylphenyl) fluorene, 9,9-bis(4-(2-hydroxyethoxy)-3-tert-butylphenyl) fluorene, 9,9-bis(4-(2-hydroxyethoxy)-3-cyclohexylphenyl) fluorene, 9,9-bis(4-(2-hydroxyethoxy)-3-phenylphenyl) fluorene, 9,9-bis(4-(2-hydroxyethoxy)-3,5-dimethylphenyl) fluorene, 9,9-bis(4-(2-hydroxyethoxy)-3-tert-butyl-6-methylphenyl)fluorene, and 9,9-bis(4-(3-hydroxy-2,2-dimethylpropoxy)phenyl)fluorene. Examples thereof further include dihydroxy compounds having a cyclic ether structure which are represented, for example, by dihydroxy compounds represented by the following general formula (2) or by spiro glycols represented by the following general formula (3).

Preferred of these are the dihydroxy compounds having a cyclic ether structure. Especially preferred among the dihydroxy compounds having a cyclic ether structure are anhydrous sugar alcohols such as those represented by general formula (2). More specifically, examples of the dihydroxy compounds represented by general formula (2) include isosorbide, isomannide and isoidide, which are stereoisomers.

Examples of the dihydroxy compounds represented by the following general formula (3) include 3,9-bis(1,1-dimethyl-2-hydroxyethyl)-2,4,8,10-tetraoxaspiro(5.5)undecane (common name, spiro glycol), 3,9-bis(1,1-diethyl-2-hydroxyethyl)-2,4,8,10-tetraoxaspiro(5.5)undecane, or 3,9-bis(1,1-dipropyl-2-hydroxyethyl)-2,4,8,10-tetraoxaspiro(5.5) undecane. One of these compounds may be used alone, or two or more thereof may be used in combination.

[Chem. 4]

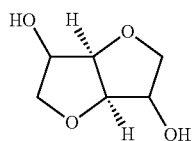
(2)

[Chem. 5]

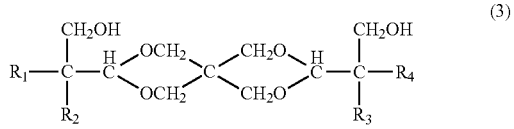
(3)

In general formula (3), R$_1$ to R$_4$ each independently are an alkyl group having 1 to 3 carbon atoms.

The dihydroxy compounds represented by formula (2) are ether diols which can be produced from glucides with biogenic matter as raw-materials. In particular, isosorbide can be produced at low cost by adding water to D-glucose, which is obtained from starches, and then conducting dehydration, and thus is available as resources in large quantities. In view of these circumstances, isosorbide is the most preferred.

Incidentally, dihydroxy compounds having the portion represented by general formula (1) as part of the structure thereof, such as the dihydroxy compounds represented by isosorbide, are apt to be gradually oxidized by oxygen. It is therefore preferred to prevent water inclusion during storage or during handling in production in order to prevent decomposition caused by oxygen. It is also preferred to use a deoxidizer or to employ a nitrogen atmosphere.

Upon oxidation, isosorbide generates decomposition products including formic acid. For example, in case where isosorbide containing those decomposition products is used for producing a polycarbonate resin, the decomposition products are causative of coloring of the polycarbonate resin being obtained or cause a considerable deterioration in the properties thereof. There also is a possibility that the decomposition products might affect the polymerization reaction to make it impossible to obtain a polymer having a high molecular weight. In the case where a stabilizer for preventing generation of formic acid has been added, a polycarbonate resin which has taken a color or has considerably deteriorated properties may be obtained, depending on the kind of the stabilizer.

It is therefore preferred in the invention to use a specific stabilizer such as the following. As the stabilizer, it is preferred to use a stabilizer such as a reducing agent, antacid, antioxidant, deoxidizer, light stabilizer, pH stabilizer or heat stabilizer. Since the dihydroxy compound is apt to alter especially under acidic conditions, it is preferred that a basic stabilizer is contained.

Examples of the reducing agent among those stabilizers include sodium borohydride and lithium borohydride. Examples of the antacid include alkali metal salts such as sodium hydroxide. When such an alkali metal salt is added, there are cases where the alkali metal serves as a polymerization catalyst. Consequently, there is a possibility that excessive addition thereof might render the polymerization reaction uncontrollable.

Examples of the basic stabilizer include the hydroxides, carbonates, phosphates, phosphites, hypophosphites, borates or fatty acid salts of Group-1 or Group-2 metals of the long-form periodic table (Nomenclature of Inorganic Chemistry IUPAC Recommendations 2005). Examples thereof further include basic ammonium compounds such as tetramethylammonium hydroxide, tetraethylammonium hydroxide, tetrapropylammonium hydroxide, tetrabutylammonium hydroxide, trimethylethylammonium hydroxide, trimethylbenzylammonium hydroxide, trimethylphenylammonium hydroxide, triethylmethylammonium hydroxide, triethylbenzylammonium hydroxide, triethylphenylammonium hydroxide, tributylbenzylammonium hydroxide, tributylphenylammonium hydroxide, tetraphenylammonium hydroxide, benzyltriphenylammonium hydroxide, methyltriphenylammonium hydroxide, and butyltriphenylammonium hydroxide or amine compounds such as 4-aminopyridine, 2-aminopyridine, N,N-dimethyl-4-aminopyridine, 4-diethylaminopyridine, 2-hydroxypyridine, 2-methoxypyridine, 4-methoxypyridine, 2-dimethylaminoimidazole, 2-methoxyimidazole, imidazole, 2-mercaptoimidazole, 2-methylimidazole and aminoquinoline. Of these, the phosphates or phosphites of sodium or potassium are preferred from the standpoints of the effect thereof and the ease of removal thereof by distillation which will be described later. Especially preferred is disodium hydrogen phosphate or disodium hydrogen phosphite.

There are no particular limitations on the content of those basic stabilizers in the dihydroxy compound. In case where the content thereof is too low, there is a possibility that the effect of preventing the alteration of the dihydroxy compound might not be obtained. When the content thereof is too high, there are cases where the dihydroxy compound is altered. Consequently, the content of those basic stabilizers is usually preferably 0.0001-1% by mass, more preferably 0.001-0.1% by mass, based on the dihydroxy compound.

When the dihydroxy compound which contains those basic stabilizers is used as a starting material for producing a polycarbonate resin, not only the basic stabilizers themselves serve as a polymerization catalyst to make it difficult to control polymerization rate or quality, but also the presence of the basic stabilizers leads to a deterioration in initial hue, resulting in molded polycarbonate resin articles having impaired light resistance. It is therefore preferred that the basic stabilizers should be removed with an ion-exchange resin or by distillation or the like before the dihydroxy compound is used as a starting material for producing a polycarbonate resin.

Especially when the dihydroxy compound is a compound having a cyclic ether structure, e.g., isosorbide, this dihydroxy compound is apt to be gradually oxidized by oxygen. It is therefore preferred to prevent water inclusion during storage or production in order to prevent decomposition caused by oxygen. It is also preferred to use a deoxidizer or the like or to handle the dihydroxy compound under a nitrogen atmosphere.

There are cases where isosorbide, upon oxidation, generates decomposition products including formic acid. For example, in case where isosorbide containing those decomposition products is used as a starting material for producing a polycarbonate resin, there is the possibility of resulting in a colored polycarbonate resin. There also is a possibility that the decomposition products considerably deteriorate the properties of the resin. In addition, there are cases where the decomposition products affect the polymerization reaction to make it impossible to obtain a polymer having a high molecular weight.

It is preferred to purify the dihydroxy compound by distillation in order to obtain the dihydroxy compound which does not contain the oxidative-decomposition products and to remove the basic stabilizers described above. The distillation in this case may be simple distillation or continuous distillation, and is not particularly limited.

With respect to distillation conditions, it is preferred to conduct distillation at a reduced pressure under an inert gas atmosphere such as argon or nitrogen. From the standpoint of inhibiting thermal alteration, it is preferred to conduct the distillation under the conditions of preferably 250° C. or lower, more preferably 200° C. or lower, especially preferably 180° C. or lower.

Through such purification by distillation, the content of formic acid in the dihydroxy compound having the portion represented by general formula (1) as part of the structure thereof is reduced to preferably 20 weight ppm or less, more preferably 10 weight ppm or less, especially preferably 5 weight ppm or less. As a result, polymerizability in polycarbonate resin production is not impaired and a polycarbonate resin having an excellent hue and excellent thermal stability can be produced.

The content of formic acid is determined using ion chromatography by the following procedure. In the following procedure, isosorbide is used as a representative dihydroxy compound.

About 0.5 g of isosorbide is precisely weighed out and put in a 50-mL measuring flask, and pure water is added thereto to adjust the volume of the solution. An aqueous sodium formate solution is used as a reference sample. The peak which agrees in retention time with the peak for the reference sample is taken as the peak assigned to formic acid, and the amount of formic acid is determined from the area of the peak by the absolute calibration method.

As an ion chromatograph, use is made of Type DX-500, manufactured by Dionex Corp. As a detector, a conductivity detector was used. As measuring columns, use is made of AG-15 and AS-15, both manufactured by Dionex Corp., as a guard column and a separation column, respectively. The sample to be examined is injected into a 100-μl sample loop, and 10-mM NaOH is used as an eluent to conduct analysis at a flow rate of 1.2 ml/min and a thermostatic-chamber temperature of 35° C. As a suppressor is used a membrane suppressor. As a regenerant is used 12.5-mM aqueous $H_2SO_4$ solution.

The polycarbonate resin to be used in the invention can further contain structural units other than the structural units derived from a dihydroxy compound having a portion represented by general formula (1). Examples thereof include structural units derived from the aliphatic dihydroxy compounds described in International Publication No. 2004/111106 or structural units derived from the alicyclic dihydroxy compounds described in International Publication No. 2007/148604.

It is preferred that the polycarbonate resin should contain structural units derived from at least one dihydroxy compound selected from the group consisting of ethylene glycol, 1,3-propanediol, 1,4-butanediol, 1,5-pentanediol and 1,6-hexanediol, among the structural units derived from those aliphatic dihydroxy compounds.

It is preferred that a 5-membered cyclic structure or a 6-membered cyclic structure should be contained among the structural units derived from those alicyclic dihydroxy compounds. In particular, the 6-membered cyclic structure may be in a chair or boat form which has been fixed by means of covalent bonding. By introducing structural units derived from an alicyclic dihydroxy compound having any of these structures, the polycarbonate resin obtained can be made to have enhanced heat resistance. The number of the carbon atoms contained in the alicyclic dihydroxy compound is usually preferably 70 or less, more preferably 50 or less, even more preferably 30 or less.

Examples of the alicyclic dihydroxy compounds containing a 5-membered cyclic structure or 6-membered cyclic structure include the compounds described in the International Publication documents. Preferred of these is cyclohexanedimethanol, tricyclodecanedimethanol, adamantanediol or pentacyclopentadecanedimethanol. From the standpoints of profitability, heat resistance, etc., cyclohexanedimethanol or tricyclodecanedimethanol is most preferred. These compounds may be used alone or in combination of two or more thereof.

Incidentally, 1,4-cyclohexanedimethanol, which is easily available industrially, is preferred among cyclohexanedimethanol.

In the polycarbonate resin to be used in the invention, the content of the structural units derived from a dihydroxy compound having the portion represented by general formula (1) as part of the structure thereof is preferably 30% by mole or higher, more preferably 50% by mole or higher, and is preferably 90% by mole or less, more preferably 80% by mole or less.

By regulating the content thereof to a value within that range, the polycarbonate resin can be inhibited from suffering, for example, the coloring due to carbonate structures and the coloring due to impurities which are contained in a slight amount because of the use of a biological resources substance. This resin hence can be satisfactorily used as a polycarbonate resin having visible-light transmission properties.

Furthermore, a balance among properties such as adequate moldability, mechanical strength or heat resistance can be attained, the balance being difficult to attain with a polycarbonate resin configured only of structural units derived from a dihydroxy compound having the portion represented by general formula (1) as part of the structure thereof.

In the polycarbonate resin to be used in the invention, the molar ratio of the structural units derived from a dihydroxy compound having the portion represented by general formula (1) as part of the structure thereof to the structural units derived from an aliphatic dihydroxy compound or the structural units derived from an alicyclic dihydroxy compound can be selected at will. However, there is a possibility that regulating the molar ratio might improve impact strength (e.g., notched Charpy impact strength). Furthermore, by regulating the molar ratio, the polycarbonate resin can be made to have a desired glass transition temperature.

It is preferred that the polycarbonate resin to be used in the invention should be made up of structural units derived from a dihydroxy compound having the portion represented by general formula (1) as part of the structure thereof and either structural units derived from an aliphatic dihydroxy compound or structural units derived from an alicyclic dihydroxy compound. However, the polycarbonate resin may contain structural units derived from other dihydroxy compounds, so long as the objects of the invention are not defeated thereby. Although the other dihydroxy compounds are not particularly limited in the kinds thereof, it is preferred that the content of aromatic dihydroxy compounds should be as low as possible.

The glass transition temperature (Tg) of the polycarbonate resin to be used in the invention, which is measured by differential scanning calorimetry (DSC), is preferably 80° C. or higher but lower than 145° C., more preferably 90° C. or higher but lower than 145° C., even more preferably 100° C. or higher but lower than 145° C. Usually, the polycarbonate resin has a single glass transition temperature. By suitably regulating the monomer proportions so as to be within the ranges described herein, the polycarbonate resin can be regulated so as to have such a glass transition temperature.

The polycarbonate resin to be used in the invention changes remarkably in modulus of elasticity at around the glass transition temperature. Consequently, a sheet of the resin can be easily rendered embossable by thermal softening, and the embossed pattern can be easily fixed by cooling. The transferability is satisfactory. Furthermore, by regulating the glass transition temperature thereof to a value within that preferred range, the polycarbonate resin can be made to have advantages such as, for example, that the embossed pattern has so high heat resistance that the pattern does not disappear even when, for example, immersed in boiling water.

The polycarbonate resin to be used in the invention can be produced by a polymerization method in general use. Either a phosgene process or a transesterification process in which dihydroxy compounds are reacted with a carbonic diester may be used. Of these, the transesterification process is preferred in which a dihydroxy compound having the portion represented by general formula (1) as part of the structure thereof and other dihydroxy compound(s) are reacted with a carbonic diester under the presence of a polymerization catalyst. The transesterification process is a technique of polymerization in which the dihydroxy compounds are mixed with a carbonic diester, a basic catalyst, and an acidic substance for neutralizing the catalyst and a transesterification reaction is conducted.

Examples of the carbonic diester include diphenyl carbonate, ditolyl carbonate, bis(chlorophenyl)carbonate, di-m-cresyl carbonate, dinaphthyl carbonate, bis(biphenyl)carbonate, diethyl carbonate, dimethyl carbonate, dibutyl carbonate or dicyclohexyl carbonate. Of these, diphenyl carbonate is suitable.

The molecular weight of the thus-obtained polycarbonate resin to be used in the invention, which contains structural units derived from a dihydroxy compound having the portion represented by general formula (1) as part of the structure thereof, can be expressed in terms of reduced viscosity.

The reduced viscosity thereof is usually preferably 0.30 dL/g or higher, more preferably 0.35 dL/g or higher, and the upper limit of the reduced viscosity thereof is preferably 1.20 dL/g or less, more preferably 1.00 dL/g or less, even more preferably 0.80 dL/g or less. In case where the reduced viscosity of the polycarbonate resin is too low, there is a possibility that this polycarbonate resin might give molded articles having insufficient mechanical strength. In case where the reduced viscosity thereof is too high, this polycarbonate resin tends to show reduced flowability during molding, resulting in a decrease in productivity or moldability.

The reduced viscosity is determined by using methylene chloride as a solvent to prepare a solution having a polycarbonate concentration precisely adjusted to 0.6 g/dL and examining the solution with an Ubbelohde viscometer at a temperature of 20.0±0.1° C.

The polycarbonate resin to be used in the invention shows reduced light absorption in the visible to near-ultraviolet wavelength regions and has excellent weatherability with respect to yellowing deterioration due to exposure to light. Because of this, use of an ultraviolet absorber for inhibiting the resin itself from yellowing can be omitted, or even when the ultraviolet absorber is used, the amount thereof can be reduced significantly. When a measure against yellowing deterioration is necessary as in the case where the composition contains a resin other than the polycarbonate resin to be used in the invention, an ultraviolet absorber may be added in a minimum amount necessary for inhibiting the deterioration.

In this case, the amount of the ultraviolet absorber to be added, per 100% by mass all resins constituting the layer in which the polycarbonate resin is contained as a main component, is preferably in the range of 0.0001 to 10% by mass. The proportion in which the ultraviolet absorber is to be incorporated is more preferably 0.0005% by mass or larger and 1% by mass or less, even more preferably 0.001% by mass or larger and 0.5% by mass or less, especially preferably 0.01% by mass or larger and 0.2% by mass or less.

So long as the addition amount thereof is 0.0001% by mass or larger, the ultraviolet absorber can fully exhibit the ultraviolet-absorbing performance. So long as the addition amount thereof is 10% by mass or less, it is possible to inhibit the resins from taking a color and to attain a reduction in starting-material cost. Furthermore, by regulating the amount of the ultraviolet absorber so as to be within that range, the weatherability of the glittering resin composition of the invention can be improved without permitting the ultraviolet absorber to bleed out to the surface of the glittering resin composition of the invention or without causing the glittering resin composition of the invention to have reduced mechanical properties.

<Ultraviolet Absorber>

As the ultraviolet absorber which is added according to need to the polycarbonate resin to be used in the invention, various commercial ultraviolet absorbers can be used. However, ultraviolet absorbers which are in exclusive use for addition to conventionally known aromatic polycarbonate resins are suitable.

Examples of the ultraviolet absorber include benzotriazole-based ultraviolet absorbers such as 2-(2'-hydroxy-5'-tert-octylphenyl)benzotriazole, 2-(3-tert-butyl-5-methyl-2-hydroxyphenyl)-5-chlorobenzotriazole, 2-(5-methyl-2-hydroxyphenyl)benzotriazole, 2-[2-hydroxy-3,5-bis(α,α-dimethylbenzyl)phenyl]-2H-benzotriazole, or 2,2'-methylenebis(4-cumyl-6-benzotriazolephenyl), benzoxazine-based ultraviolet absorbers such as 2,2'-p-phenylenebis(1,3-benzoxazin-4-one), or hydroxyphenyltriazine-based ultraviolet absorbers such as 2-(4,6-diphenyl-1,3,5-triazine-2-yl)-5-(hexyl)oxy-phenol.

Ultraviolet absorbers having a melting point in the range of, in particular, 120 to 250° C. are preferred. When an ultraviolet absorber having a melting point of 120° C. or higher is used, the surface dulling of molded articles due to gas is mitigated.

More specifically, examples thereof include benzotriazole-based ultraviolet absorbers such as 2-(2'-hydroxy-5'-methylphenyl)benzotriazole, 2-(2'-hydroxy-3'-tert-butyl-5'-methylphenyl)-5-chlorobenzotriazole, 2-[2'-hydroxy-3'-(3",4",5",6"-tetrahydrophthalimidomethyl)-5'-methylphenyl]benzotriazole, 2,2-methylenebis[4-(1,1,3,3-tetramethylbutyl)-6-(2H-benzotriazol-2-yl)phenol, or 2-(2-hydroxy-3,5-dicumylphenyl)benzotriazole or hydroxyphenyltriazine-based ultraviolet absorbers such as 2-(4,6-diphenyl-1,3,5-triazine-2-yl)-5-(hexyl)oxy-phenol.

Especially preferred of these is 2-(2-hydroxy-3,5-dicumylphenyl)benzotriazole, 2,2-methylenebis[4-(1,1,3,3-tetramethylbutyl)-6-(2H-benzotriazol-2-yl)phenol, or 2-(4,6-diphenyl-1,3,5-triazine-2-yl)-5-(hexyl)oxy-phenol. These ultraviolet absorbers may be used alone or in combination of two or more thereof <Glittering Particles>

The glittering particles to be used in the invention are inorganic particles (excluding metal particles) coated with a metal or metal oxide, or are metal particles.

The inorganic particles (excluding metal particles) preferably are at least one member selected from the group consisting of glass flakes, alumina flakes, silica flakes and mica flakes. Two or more of these materials may be used in combination.

It is preferred that the metal with which the inorganic particles (excluding metal particles) are coated should be at least one member selected from the group consisting of silver, nickel, gold, titanium and aluminum. It is also preferred that the metal oxide with which the inorganic particles (excluding metal particles) are coated should be at least one member selected from the group consisting of silver oxide, titanium oxide, iron oxide and aluminum oxide.

Furthermore, the metal particles preferably are at least one member selected from the group consisting of silver flakes, nickel flakes, gold flakes, titanium flakes and aluminum flakes. Two or more of these materials may be used in combination.

The content of the glittering particles to be used in the invention, per 100 parts by weight of the polycarbonate resin to be used in the invention, is 0.1 parts by weight or more, preferably 0.5 parts by weight or more, more preferably 0.8 parts by weight or more. The content thereof is 10 parts by weight or less, preferably 5 parts by weight or less, more preferably 2.5 parts by weight or less. By regulating the content thereof so as to be within that range, a glittering resin composition which glitters evenly to a degree that is neither too low nor too high is obtained. Thus, sufficient and satisfactory design attractiveness can be obtained.

It is preferred that the glittering particles to be used in the invention should have an average particle diameter of 20 μm or larger and 100 μm or less. By regulating the glittering particles so as to have an average particle diameter of 20 μm or larger, the resin composition can be made to produce a glittering design which as a whole is starry. On the other hand, by regulating the glittering particles so as to have an average particle diameter of 100 μm or less, the glittering particles can be inhibited from being excessively crushed during a process in which shearing is applied to the particles as in the case where a master batch for the glittering resin composition is produced by a melt kneading method or the case where a product is molded by extrusion molding or the like. As a result, a sufficient design effect can be produced. In addition, the processing failure in a product in which a crack generates from a large particle can also be inhibited.

It is preferred that the glittering particles should have an average thickness of 1 μm or larger and 10 μm or less. By regulating the glittering particles so as to have an average thickness of 1 μm or larger, the glittering particles, in this case also, can be inhibited from being excessively crushed during a process in which shearing is applied to the particles. On the other hand, by regulating the glittering particles so as to have an average thickness of 10 μm or less, the glittering resin composition, when being molded, can be inhibited from showing poor flowability or causing failures such as flow marks, streaks or holes. It is more preferred that the average thickness thereof should be 6 μm or less.

With respect to the shape of the glittering particles, it is preferred that the shape thereof should be flat and flaky. In particular, glittering particles obtained by coating the surface of flat glass flakes with a thin metal film have high surface smoothness, can glitter exceedingly highly, and are suitable for obtaining a starry glittering design. Furthermore, flat glittering particles are apt to be oriented, due to flow orientation during extrusion molding, so as to be parallel to the surfaces of the sheet formed. Thus, high glitter can be efficiently obtained.

Specific examples of the glittering particles obtained by coating the surface of flat glass flakes with a thin metal film include "Metashine", manufactured by Nippon Sheet Glass Co., Ltd. Of such flaky materials, flat glass flakes coated with thin films of silver and nickel can be used to efficiently obtain intense glitter.

These particles have some degree of distribution with respect to plain-direction dimensions. However, the thickness thereof is satisfactorily even because of the nature of the production process in which flakes are obtained by crushing a thin-film raw material. There is hence an advantage that extrusion molding failures due to the inclusion of exceedingly thick large particles are less apt to occur.

In the case of conventional aromatic polycarbonate resins produced using 2,2-bis(4-hydroxyphenyl)propane (common name, bisphenol A) as a starting-material dihydroxy compound, there have been cases where when titanium oxide-coated flakes of mica, aluminum or the like which are in general use as glittering particles are mixed with the polycarbonate resins, the resins suffer a considerable decrease in weight-average molecular weight and deteriorate accordingly, resulting in troubles such as blushing and embrittlement.

In contrast, in the case of the polycarbonate resin to be used in the invention, even when the glittering particles, which are suitable, are selected and mixed with the polycarbonate resin, the resin suffers little decrease in weight-average molecular weight and little deterioration and does not arouse troubles such as those shown above.

Although this phenomenon has not been understood accurately, the following factor is presumed to cause the phenomenon. Bisphenol A, shown above as an example, is a dihydroxy compound in which the hydroxyl groups have been directly bonded to the aromatic rings. Meanwhile, the polycarbonate resin to be used in the invention is a resin which contains, in the proportion shown above, structural units derived from a dihydroxy compound having the portion represented by general formula (1) as part of the structure thereof and in which the dihydroxy compound in itself is a compound having no aromatic ring or a compound having no hydroxyl group directly bonded to an aromatic ring.

Namely, it is presumed that when the glittering particles are mixed with an aromatic polycarbonate resin that contains structural units of a dihydroxy compound in which each hydroxyl group has been directly bonded to an aromatic ring and the resultant mixture is melt-kneaded especially at a high temperature and molded, then the glittering particles chemically exert some influence to cleave the molecular chain of the aromatic polycarbonate resin and reduce the weight-average molecular weight thereof.

In contrast, the polycarbonate resin to be used in the invention is presumed to rarely undergo such a phenomenon because this resin contains structural units derived from a dihydroxy compound having the portion represented by general formula (1) as part of the structure thereof.

In particular, in the case where the polycarbonate resin to be used in the invention contains structural units derived from a dihydroxy compound represented by general formula (2), which has no aromatic ring, among dihydroxy compounds having the portion represented by general formula (1) as part of the structure thereof, this resin can be significantly inhibited from decreasing in weight-average molecular weight even when the glittering particles are mixed therewith. This polycarbonate resin hence is preferred.

<Glittering Resin Composition>

A process for producing the glittering resin composition of the invention can be selected according to the desired configuration, and is not particularly limited. For example, the resin composition can be obtained by dry-blending the polycarbonate resin with the glittering particles and other additives, etc. so as to result in contents within the ranges described herein, introducing the mixture into a single-screw extruder, twin-screw extruder or the like, and melt-kneading, extruding, cooling and molding the mixture.

Alternatively, the resin composition can be obtained by melt-kneading the polycarbonate resin together with a larger amount of the glittering particles and other additives, etc. to produce a master batch and thereafter melt-kneading the master batch again while suitably diluting the master batch with the polycarbonate resin to regulate the resultant composition so as to have contents within the ranges described herein. The shape to be obtained in this case may be the general pellet shape. However, the glittering resin composition of the invention should not be precluded from being handled in the form of, for example, a sheet or the like as will be described later.

The temperatures of the extruder and the orifice in the case of conducting melt kneading are not particularly limited so long as the temperatures thereof are within a range suitable for the polycarbonate resin to be used in the invention. However, it is usually preferred that the temperatures thereof should be in the range of 180 to 240° C.

The glittering resin composition of the invention is characterized by suffering little decrease in weight-average molecular weight as described above. When the value of weight-average molecular weight of the polycarbonate resin to be used in the invention, as determined by gel permeation chromatography, is taken as 100%, then the retention of weight-average molecular weight of the glittering resin composition of the invention is preferably 90% or higher, more preferably 92% or higher, even more preferably 94% or higher.

For regulating the retention of the weight-average molecular weight so as to be within that range, use may be made of a method in which the amount of the glittering particles to be added is suitably regulated within the range shown herein. However, usable methods should not be construed as being limited to this method.

Although the glittering resin composition of the invention contains the polycarbonate resin as a main component, other known resins can be mixed therewith unless the features of the invention are lessened thereby.

Furthermore, a heat stabilizer, light stabilizer, fluorescent brightener, bluing agent, transparent colorant, antistatic agent, etc. may be added as other additive ingredients unless the features of the invention are lessened thereby.

<Molded Object>

The molded object obtained by injection-molding the glittering resin composition of the invention can have a glittering design selected from a wide range. A molded article to which a desired glittering design and a desired color tone have been imparted without via a coating step can be easily obtained by using a raw material therefor that has been colored beforehand with a pigment or the like or by mixing the resin composition with colored pellets.

Furthermore, since the planes of the glittering particles are apt to be oriented in parallel to the surface of the molded object, the molded object has excellent surface smoothness although the resin is a filler-containing resin. A molded object having a mirror surface can also be obtained easily.

Moreover, by applying a transparent decorative film to the molded object or coating the molded object with a transparent coating composition, the appearance is rendered deeper. Thus, it is possible to obtain a design which has been difficult to obtain with any of conventionally known molding techniques and coating techniques.

<Decorated Sheet>

A sheet having a layer obtained by forming the glittering resin composition of the invention into a film by extrusion molding or another technique is suitable for use as a decorated sheet having any of a wide variety of glittering designs.

Methods for forming the glittering resin composition of the invention into a film are not particularly limited, and a technique in ordinary use for forming a thin sheet, such as T-die molding or calendering, can be used without limitations. For obtaining a product having a multilayer structure, use can be made of a method in which the resin composition is formed into a film which is in the state of having been laminated, by coextrusion molding in which a multi-manifold or a feed block is used, or a method in which a single-layer sheet of the resin composition is laminated to other sheet(s) by hot laminating or the like.

In the case where a decorated sheet in which a transparent protective layer having visible-light transmission properties on a surface is laminated is obtained, it is preferred that the decorated sheet should have a structure which at least includes the layer A and layer B shown below.

Layer A: a resin layer which has a visible-light transmission properties and has a thickness of 10 μm or larger.

Layer B: a resin layer which is constituted of the glittering resin composition of the invention and has a thickness of 30 μm or larger.

Suitable examples of the resin to be used as layer A include the following resins which have visible-light transmission properties: crystalline polyester resins such as the polycarbonate resin to be used in the glittering resin composition of the invention, polybutylene terephthalate resins, polytrimethylene terephthalate resins or polyethylene terephthalate resins, amorphous or lowly crystalline polyester resins that have a polyethylene terephthalate structure in which the dihydroxy-compound starting material or the dicarboxylic-acid starting material was partly replaced with another compound, aromatic polycarbonate resins, acrylic resins such as polymethyl methacrylate resins, acrylonitrile/styrene copolymer resins, methyl methacrylate/styrene copolymer resins, amorphous polyolefin resins, blends of two or more of these resins, resin compositions obtained by blending an elastomer ingredient with these resins to impart flexibility thereto, and the like.

Of these resins, the polycarbonate resin to be used in the glittering resin composition of the invention is suitable for use also as layer A. This is because when this resin is used, integrated layers can be easily obtained by coextrusion molding and the sheet can be inhibited from having warpage or shrinkage wrinkles after the film formation.

The thickness of layer A is usually preferably 10 μm or larger, more preferably 30 μm or larger. In the case where surface-protective properties are ensured or a deeply embossed design is imparted, the thickness thereof is preferably 50 μm or larger. There is no particular upper limit on the thickness of the layer. However, the thickness thereof is regulated to usually preferably 120 μm or less, more preferably 105 μm or less. Thus, the sheet has intact suitability for winding and bending, and such layer A thickness contributes also to a thickness and weight reduction in the sheet product.

The thickness of layer B is usually preferably 30 μm or larger, more preferably 50 μm or larger. In case where layer B is thinner than that, it is difficult to evenly disperse the glittering particles therein. There is no particular upper limit on the thickness of the layer. However, the thickness thereof is regulated to usually preferably 150 μm or less, more preferably 130 μm or less. Thus, the sheet has intact suitability for winding and bending, and such layer B thickness contributes also to a thickness and weight reduction in the sheet product.

Furthermore, it is possible to obtain a decorated sheet which is equipped with a colored layer and which is suitable for imparting a base-hiding design when applied to a base such as, for example, a metal plate, wooden board, resin plate, gypsum board, earthenware, concrete wall or mortar wall. A preferred embodiment has a structure which at least includes the layer A, the layer B and the following layer C in this order from the front surface side.

Layer C: a resin layer which is constituted of a resin composition including a thermoplastic resin and a colorant and which has a thickness of 45 to 260 μm.

Layer C is a colored layer and is disposed for the purpose of, for example, imparting a color design to the decorated sheet, imparting the effect of hiding the base from view, or improving the coloration of the glittering design layer or the like. According to need, layer C may have been coated with a metal or metal oxide for imparting a metallic appearance thereto.

The thermoplastic resin to be used in layer C is not particularly limited. However, it is preferred to select the thermoplastic resin from the resins generally called methacrylic resins or methacrylic ester resins. Especially suitable is a methacrylic ester resin which includes a core/shell type copolymer composition obtained by graft-polymerizing a methacrylic ester using a crosslinked acrylic rubber elastomer as cores. Such acrylic resins are called soft acrylics, flexible acrylics, etc., and these acrylic resins which have excellent calenderability are sometimes called calender acrylics.

When layer C contains the crosslinked elastomer, melt tension is imparted to the sheet and the sheet is less apt to suffer a film formation failure, e.g., drawdown, during calendering. Furthermore, releasability from metal rolls is also imparted, and the sheet is rendered easily calenderable without especially adding a lubricant or the like.

The colorant to be used in layer C is not particularly limited in the kind and addition amount thereof. However, in the case of coloring in a white tint, as an example, it is preferred to use a technique in which a titanium oxide pigment, which has a high hiding effect and a fine particle diameter and which is less apt to adversely affect the processability of the resin sheet, is used and a color pigment is added in a small amount for the purpose of color regulation.

With respect to the effect of hiding the base from view, there are often cases where resin sheets for use as interior building materials, for example, are required to have an opacity as measured in accordance with JIS K5600 (1999) of 0.98 or higher. Meanwhile, there are cases where the coloring and hiding properties are reduced so that the color and design of the base are reflected, rather than hidden.

Methods for forming layer C are not particularly limited. The layer can be formed by T-die molding, inflation molding, calendering, or another extrusion molding technique. Layer C may be formed by coextrusion molding together with the layer A and the layer B. Preferred of these is calendering, which readily conforms to the small production of a wide variety of products.

It is preferred that layer C should have a 23° C. tensile elongation at break of 100% or higher and 350% or less, from the standpoint of ensuring processability required for application to the base. The lower limit thereof is more preferably 125% or higher, even more preferably 150% or higher, and the upper limit thereof is more preferably 325% or less, even more preferably 300% or less. So long as the lower limit thereof is within that range, the layer has excellent processability in laminating, embossing, etc. So long as the upper limit thereof is within that range, this layer C, even when laminated to layer A having high surface hardness, enables the resin sheet to retain high surface hardness.

The thickness of layer C is preferably 45 μm or larger, more preferably 70 μm or larger. This layer C having such a thickness can sufficiently function as a tension-imparting layer when an embossed design is imparted to the front-side surface of the decorated sheet. Although there is no particular upper limit on the thickness thereof, the thickness of layer C is preferably 260 μm or less, more preferably 240 μm or less. When layer C has a thickness within that range, the sheet has intact suitability for winding or bending. Furthermore, such layer C thickness contributes also to a thickness and weight reduction in the sheet product.

The decorated sheet of the invention can further include a printed layer (layer D) therein. Layer D can be formed by gravure printing, offset printing, screen printing or the like or by a known printing method. The printed layer may have a pattern such as, for example, a marble grain or wood grain pattern, a geometric pattern or an abstract pattern. The printed layer may have been formed by solid printing or partial printing.

The position where layer D is to be disposed is not particularly limited, and layer D may be disposed at any of the front surface side of layer A, between layer A and layer B, between layer B and layer C, and the outer side of layer C.

<Impartation of Embossed Design to the Decorated Sheet>

In the case where an embossed design is imparted to the decorated sheet of the invention, layer B is first stacked according to need with layer A and layer C and the layers are laminated by thermal fusion laminating, etc. Alternatively, the decorated sheet may be one obtained beforehand through laminating by coextrusion molding. This decorated sheet is sufficiently preheated with heated rolls, an infrared heater or the like and is then sandwiched and passed between an embossing roll and a nip roll, thereby transferring an embossed pattern thereto. Thereafter, the sheet is cooled with a cooling roll to fix the embossed pattern. The series of processing steps can be consecutively performed using an embossing machine which has hitherto been used for the embossing of decorated PVC sheets.

With respect to preheating conditions in this processing, it is preferred to heat the sheet to a temperature which is higher by 15° C. or more than the glass transition temperature of the layer to which an embossed pattern is to be imparted. In general, in the case of configurations which include no layer C, the modulus of elasticity of this sheet changes sharply at around that temperature and, hence, this sheet is apt to come to have a defect such as, for example, elongation or wrinkling. However, the inclusion of layer C enables the decorated sheet to be stably embossed.

There are cases where for the purpose of protecting the embossed pattern obtained, a resin layer having visible-light transmission properties is further disposed as a surface layer. In this case, a resin sheet constituted of any of the resins usable in layer A is superposed on the front-side surface of the decorated sheet to which an embossed pattern has been imparted, and is laminated to the sheet by thermal fusion laminating or the like.

The total thickness of the decorated sheet of the invention is usually preferably 75 μm or larger, more preferably 90 μm or larger. By regulating the total thickness thereof to a value within that range, the base to be covered can be sufficiently protected and the sheet is rendered easy to handle. Although there is no particular upper limit on the total thickness thereof, it is usually preferred that the total thickness of the decorated sheet should be 300 μm or less.

<Resin Sheet-Covered Metal Laminate>

In the case where the decorated sheet of the invention is laminated to a metal plate to obtain the resin sheet-covered metal laminate of the invention, examples of the metal plate to be used include various steel plates such as hot-rolled steel plates, cold-rolled steel plates, hot-dip galvanized steel plates, electrogalvanized steel plates, tin-plated steel plates and stainless-steel plates, aluminum plates or aluminum alloy plates. The metal plate may be used after having undergone a chemical treatment. The thickness of the metal plate varies depending on applications. Usually, however, the thickness thereof is selected from the range of about 0.1 to 10 mm.

The resin sheet-covered metal laminate of the invention can be produced by laminating the decorated sheet to the metal plate by a conventionally known method.

Examples thereof include a method which includes applying a thermosetting adhesive in general use, such as an acrylic adhesive, epoxy adhesive, urethane adhesive or polyester adhesive, to the metal plate in a thickness of about 2 to 10 μm on a dry basis, drying and heating the coated surface in a heating oven or the like, and immediately applying the decorated sheet of the invention and bringing the sheet into close contact with the coated surface using laminating rolls or the like. Since an acrylic resin is exclusively used as the layer C of the decorated sheet, it is preferred to use an acrylic adhesive among those adhesives from the standpoint of obtaining satisfactory adhesion. However, usable methods should not be construed as being limited to these methods.

The resin sheet-covered metal laminate of the invention is suitable for use in applications such as entrance doors for dwelling houses, various building materials, unit baths, steel furniture, housings for electrical/electronic appliances or automotive interior materials.

In particular, indoor wall materials, elevator surface plates, electrical/electronic appliance housings and the like are coming to be required to have a variety of design attractiveness, and the decorated sheet and resin sheet-covered metal laminate of the invention can meet such various requirements.

For use in applications in which the decorated sheet or resin sheet-covered metal laminate is frequently touched by humans or is frequently cleaned by wiping with a cloth or the like, surface hardness is especially required of the sheet or laminate. In this case, extremely high surface hardness can be imparted thereto by forming the layer A from a high-hardness resin or by disposing a hardcoat layer.

EXAMPLES

Examples are shown below in order to explain the invention more specifically and in more detail. However, the invention should not be construed as being limited by the following Examples.

<Production of Glittering Resin Compositions>

For producing glittering resin compositions for constituting layer B, each of the glittering particles described in Table 1 with respect to the kind, shape and coating metal was used as glittering particles. As raw-material resins, the following (b-1) and (b-2) were used. Each glittering particles was incorporated in an amount of 1.5% by mass.

(b-1): Polycarbonate resin obtained by a melt polymerization method using isosorbide as a dihydroxy compound and 1,4-cyclohexanedimethanol so as to result in (structural units derived from isosorbide)/(structural units derived from 1,4-cyclohexanedimethanol)=70/30(% by mole) and reduced viscosity=0.51 dl/g.

(b-2): "Novarex 7025A", manufactured by Mitsubishi Engineering-Plastics Corp., which is an aromatic polycarbonate resin obtained by a melt polymerization method using 2,2-bis(4-hydroxyphenyl)propane as a dihydroxy compound.

These materials were melt-kneaded and pelletized using a corotating twin-screw extruder having a bore diameter of 35 mm. The cylinder temperature was set at 230° C. when (b-1) was used, and was set at 290° C. when (b-2) was used.

In Table 1, "Metashine" is a material manufactured by Nippon Sheet Glass Co., Ltd. by coating the surface of glass flakes with a thin metal film or metal oxide; "flaky aluminum" is a large-diameter flaky aluminum material for use in metallic coating compositions which was selected from materials called the non-leafing type and having undergone no surface treatment; and "pearl mica pigment" is a pigment for use as a pearly-luster pigment and was obtained by coating the surface of a natural or synthetic mica with a thin film of titanium oxide.

With respect to the resin pellets of each of the Examples and Comparative Examples, the weight-average molecular weight was calculated by measuring a molecular-weight by gel permeation chromatography using chloroform as an eluent after removing the filler component by filtration. The results thereof are shown in Table 1. The weight-average molecular weight of the raw-material resin (b-1) was 37,200, and that of the raw-material resin (b-2) was 72,500. When the retention of weight-average molecular weight, based on the raw-material resin, was 90% or higher, this resin composition was rated as acceptable; and when the retention thereof was less than 90%, this resin composition was rated as unacceptable.

Those results demonstrate that the glittering resin compositions of the invention have suffered little decrease in weight-average molecular weight even when glittering particles that, when being melt-mixed with conventional aromatic polycarbonate resins, considerably reduce the weight-average molecular weights thereof are used therein.

<Production of Decorated Sheets Composed of Layer A and Layer B>

Two vented single-screw extruders having a bore diameter of 65 mm, a T-die having a multi-manifold mechanism, and necessary tubes were used to produce coextrusion sheets each composed of two layers of two kinds, i.e., layer A and layer B. When (b-1) was used in layer B, (b-1) was used also as layer A. When (b-2) was used in layer B, (b-2) was used also as layer A. The processing temperatures were the same as shown above. The thickness of layer A was regulated to 20 μm, and the thickness of layer B was regulated to 60 μm.

<Production of Layer C>

The following ingredients were mixed together beforehand: 70% by mass "Metablen W-377", manufactured by Mitsubishi Rayon Co., Ltd., 30% by mass "Parapet SA", manufactured by Kuraray Co., Ltd., 0.5% by mass "Metablen L-1000", manufactured by Mitsubishi Rayon Co., Ltd., and 20% by mass white pigment titanium oxide. Using a calender constituted of four metal rolls and having pre-kneading rolls in the preceding step, the mixtures was rolled and formed into a sheet under the conditions of a roll temperature of 170 to 185° C. Thus, a white sheet having a thickness of 120 μm was produced.

"Metablen W-377" is an acrylic resin containing a cross-linked acrylic-resin rubber elastomer component in a large amount and is on the market as a flexible acrylic resin for calendering.

"Parapet SA" is on the market as a flexible acrylic resin which contains a crosslinked acrylic-resin rubber elastomer component in a large amount and which combines high flexibility and satisfactory flowability. This resin is for injection molding and is especially suitable for use as a substitute for flexible PVC.

"Metablen L-1000" is on the market as an acrylic external lubricant for use in applications where the lubricant is added in a small amount for the purpose of stable production or bleeding inhibition.

TABLE 1

| | | Example 1 | Example 2 | Example 3 | Example 4 | Comparative Example 1 | Comparative Example 2 | Comparative Example 3 | Comparative Example 4 |
|---|---|---|---|---|---|---|---|---|---|
| Glittering particles | | Metashine MC5090PS | Metashine MC1080RS | flaky aluminum | pearl mica pigment | Metashine MC5090PS | Metashine MC1080RS | flaky aluminum | pearl mica pigment |
| | Coating metal | silver | titanium oxide | — | titanium oxide | silver | titanium oxide | — | titanium oxide |
| | Average particle diameter/ μm | 90 | 80 | 70 | 30 | 90 | 80 | 70 | 30 |
| | Average thickness/μm | 5 | 1 | 1 | 5 | 5 | 1 | 1 | 5 |
| Resin | | b-1 | b-1 | b-1 | b-1 | b-2 | b-2 | b-2 | b-2 |
| Weight-average molecular weight (Mw) | | 34400 | 36100 | 37000 | 35900 | 64800 | 45200 | 52500 | 45000 |
| Retention of weight-average molecular weight/% | | 92 | 97 | 99 | 97 | 89 | 62 | 72 | 62 |

As shown in Table 1, the glittering resin compositions of Examples 1 to 4 each has a retention of weight-average molecular weight, based on the raw-material resin, of 90% or higher, whereas the glittering resin compositions of Comparative Examples 1 to 4 each has a retention of weight-average molecular weight, based on the raw-material resin, of less than 90%.

<Laminating of Each Decorated Sheet Composed of Layers A and B to Layer C>

An embossing machine in general use for embossing flexible PVC sheets was used to laminate each decorated sheet composed of layers A and B to layer C by thermal fusion bonding. The heating drum was set at 140° C., and the decorated sheet composed of layers A and B and the layer C were fed from two feed shafts and integrated by thermal fusion laminating at the part where the stack came into contact with the heating drum. Thereafter, the laminated sheet was cooled and solidified by means of a cooling roll and then wound up.

<Evaluation of the Decorated Sheets for Glittering Design>

The laminated decorated sheets thus obtained, which each were composed of layers A, B and C, were visually evaluated for glittering design, and the results thereof are shown in Table 2. The laminated sheets having such satisfactory design attractiveness that the individual glittering particles were able to be perceived as highly glittering design dots were rated as "○". The laminated sheets in which the individual glittering particles were not perceived as design dots and the sheet as a whole had an even metallic appearance, the laminated sheets in which the individual glittering particles were able to be perceived as design dots but the glitter was uneven or lacking in uniformity, and the laminated sheets which had a defect attributable to a trouble which had occurred during film formation were rated as "X". The laminated sheet which had undergone no trouble during film formation but was unsatisfactory as compared with "○" was rated as "Δ".

TABLE 2

|  | Design attractiveness | Remarks |
|---|---|---|
| Example 1 | ○ | The sheet gave a satisfactory starry glitter. |
| Example 2 | ○ | The sheet gave a satisfactory starry glitter. |
| Example 3 | ○ | The sheet gave a satisfactory metallic glitter. |
| Example 4 | ○ | The sheet gave a satisfactory pearly glitter. |
| Comparative Example 1 | Δ | The sheet gave a satisfactory glitter but was slightly brittle. |
| Comparative Example 2 | X | The sheet was brittle. The sheet gave no glitter and appeared milk white as a whole. |
| Comparative Example 3 | X | The sheet was brittle. The particles were perceived as design dots, but the brightness was low. |
| Comparative Example 4 | X | The sheet was extremely brittle. The sheet was not bright and had streaks probably due to resin deterioration. |

It was demonstrated as shown in Table 2 that the laminated sheets of Examples 1 to 4, in which glittering resin compositions of the invention were used, each were able to have a beautiful glittering design and to sufficiently accomplish the objects of the invention. On the other hand, in Comparative Examples 1 to 4, in which a conventionally known aromatic polycarbonate resin was used, the resin had a lower weight-average molecular weight than the raw-material resin and the resin sheets suffered a trouble, for example, that the resin sheets were brittle or were apt to break. Furthermore, the resin sheets of the Comparative Examples underwent troubles which were presumed to be causative of the fact that the resin had suffered blushing or degradation deterioration depending on the kind of glittering particles. It was thus found that the resin sheets of the Comparative Examples failed in having a variety of glittering designs.

The invention was described above in relation to embodiments which are considered to be most practicable and preferred at present. However, the invention should not be construed as being limited to the embodiments disclosed herein, and can be suitably modified within the scope of the essential points or spirit of the invention which can be understood from the claims and the whole description. Any glittering resin composition and any decorated sheet which include such a modification and products employing these should also be construed as being within the technical scope of the invention.

This application is based on a Japanese patent application filed on Oct. 20, 2010 (Application No. 2010-235940), the entire contents thereof being incorporated herein by reference.

The invention claimed is:

1. A glittering resin composition, comprising:
a polycarbonate resin consisting of structural units derived:
(I) from a dihydroxy compound represented by formula (2)

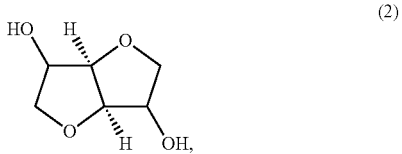

and
(II) from at least one alicyclic dihydroxy compound; and
glittering particles in an amount of 0.1 parts by weight or more and 10 parts by weight or less per 100 parts by weight of the polycarbonate resin,
wherein:
the polycarbonate resin does not comprise structural units derived from an aromatic dihydroxy compound,
a content of the structural unit derived from a dihydroxy compound represented by formula (2) is from 30% by mole to 90% by mole,
a retention of a weight-average molecular weight of the glittering resin composition is 90% or more, relative to a weight-average molecular weight of the polycarbonate resin consisting of structural units derived (I) from a dihydroxy compound represented by formula (2) and (II) from at least one alicyclic dihydroxy compound before the glittering particles are added thereto,
the glittering particles have an average particle diameter of from 20 μm to 100 μm and an average thickness of from 1 μm to 10 μm,
the glittering particles are (i) inorganic particles other than metal particles, (ii) inorganic particles coated with a metal or a metal oxide, or (iii) metal particles,
said (i) inorganic particles other than metal particles are at least one member selected from the group consisting of glass flakes, alumina flakes, silica flakes and mica flakes,
said (iii) metal particles are at least one member selected from the group consisting of silver flakes, nickel flakes, gold flakes, titanium flakes and aluminum flakes,
the polycarbonate resin has a glass transition temperature (Tg) of 80° C. or higher but lower than 145° C., and
a reduced viscosity of the polycarbonate resin is 0.30 to 1.20 dL/g.

2. The glittering resin composition according to claim 1, wherein the polycarbonate resin has a glass transition temperature (Tg) of 90° C. or higher but lower than 145° C.

3. A molded object, which is obtained by injection-molding the glittering resin composition according to claim 1.

4. A decorated sheet, comprising a layer A and a layer B, wherein:
the layer A is a resin layer that has visible-light transmission properties and a thickness of from 10 μm to 120 μm; and
the layer B is a resin layer that comprises a glittering resin composition and has a thickness of from 30 μm to 150 μm, wherein the glittering resin composition comprises:
a polycarbonate resin comprising structural units derived:
(I) from a dihydroxy compound represented by formula (2)

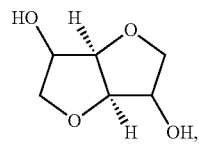

and
(II) from at least one alicyclic dihydroxy compound; and
glittering particles in an amount of 0.1 parts by weight or more and 10 parts by weight or less per 100 parts by weight of the polycarbonate resin,
wherein:
the polycarbonate resin does not comprise structural units derived from an aromatic dihydroxy compound,
a content of the structural unit derived from a dihydroxy compound represented by formula (2) is from 30% by mole to 90% by mole,
a retention of a weight-average molecular weight of the glittering resin composition is 90% or more, relative to a weight-average molecular weight of the polycarbonate resin that comprises structural units derived (I) from a dihydroxy compound represented by formula (2) and (II) from at least one alicyclic dihydroxy compound before the glittering particles are added thereto,
the glittering particles have an average particle diameter of from 20 μm to 100 μm and an average thickness of from 1 μm to 10 μm,
the glittering particles are (i) inorganic particles other than metal particles, (ii) inorganic particles coated with a metal or a metal oxide, or (iii) metal particles,
said (i) inorganic particles other than metal particles are at least one member selected from the group consisting of glass flakes, alumina flakes, silica flakes and mica flakes,
said (iii) metal particles are at least one member selected from the group consisting of silver flakes, nickel flakes, gold flakes, titanium flakes and aluminum flakes,
the polycarbonate resin has a glass transition temperature (Tg) of 80° C. or higher but lower than 145° C., and
a reduced viscosity of the polycarbonate resin is 0.30 to 1.20 dL/g.

5. The decorated sheet according to claim 4, further comprising a layer C, wherein
the layers A, B, and C are in this order and together have a total thickness in a range of from 75 μm to 300 μm, and
the layer C is a resin layer that comprises a resin composition containing a thermoplastic resin and a colorant and has a thickness of from 45 μm to 260 μm.

6. A resin sheet-covered metal laminate, which is obtained by laminating the decorated sheet according to claim 4 onto a metal plate.

7. An entrance door, comprising:
the resin sheet-covered metal laminate according to claim 6.

8. A building material, comprising:
the resin sheet-covered metal laminate according to claim 6.

9. A unit bath member, comprising:
the resin sheet-covered metal laminate according to claim 6.

10. A steel furniture member, comprising:
the resin sheet-covered metal laminate according to claim 6.

11. A housing for an electrical/electronic appliance, comprising:
the resin sheet-covered metal laminate according to claim 6.

12. An automotive interior material, comprising:
the resin sheet-covered metal laminate according to claim 6.

13. The glittering resin composition according to claim 1, wherein a content of the structural units derived from a dihydroxy compound represented by formula (2) as part of the structure thereof is from 50% by mole to 80% by mole.

14. The glittering resin composition according to claim 1, wherein the structural units derived from a dihydroxy compound represented by formula (2) are units derived from at least one of isosorbide, isomannide and isoidide.

15. The glittering resin composition according to claim 1, wherein the polycarbonate resin has a glass transition temperature (Tg) of 100° C. or higher but lower than 145° C.

16. The decorated sheet according to claim 4, wherein the layer A has a thickness of from 50 μm to 105 μm and the layer B has a thickness of from 50 μm to 130 μm.

17. The decorated sheet according to claim 4, wherein the glittering resin composition of the layer B comprises glittering particles in an amount of from 0.5 parts by weight to 5 parts by weight per 100 parts by weight of the polycarbonate resin.

18. The glittering resin composition according to claim 1, wherein the glittering resin composition of the layer B comprises glittering particles in an amount of from 0.5 parts by weight to 5 parts by weight per 100 parts by weight of the polycarbonate resin.

19. The decorated sheet according to claim 4, wherein the polycarbonate resin has a glass transition temperature (Tg) of 90° C. or higher but lower than 145° C.

20. The decorated sheet according to claim 4, wherein the decorated sheet is obtained by injection-molding of the glittering resin composition.

* * * * *